C. T. WESTLAKE & C. F. FREDE.
CAR UNDERFRAME.
APPLICATION FILED JULY 10, 1909.
979,115.
Patented Dec. 20, 1910.
2 SHEETS—SHEET 2.
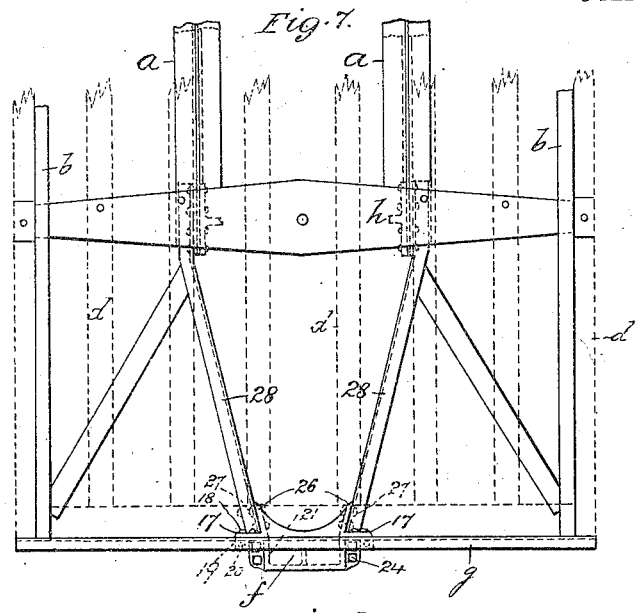
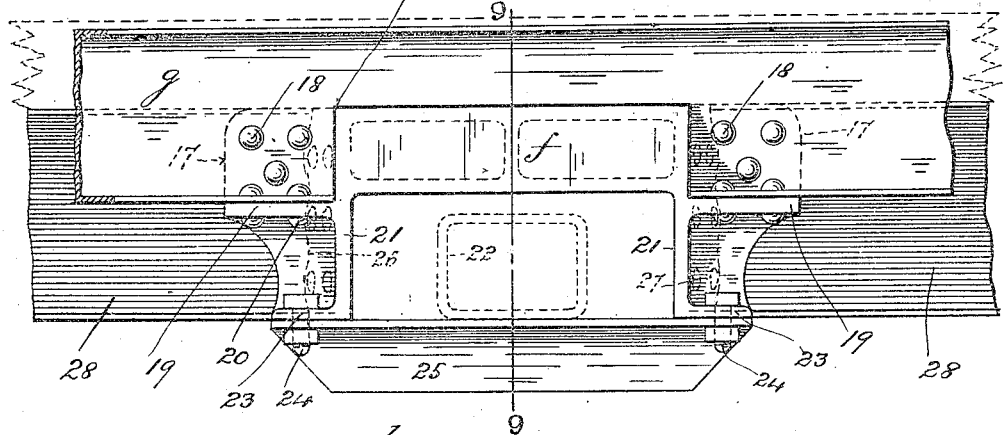
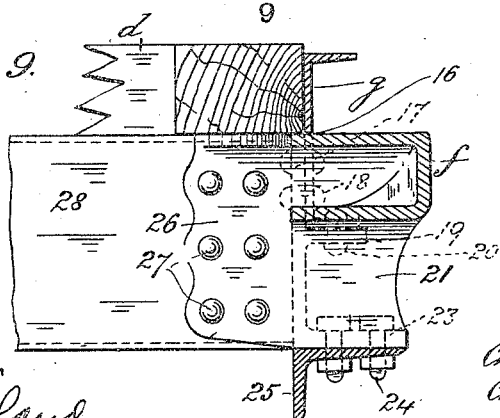
WITNESSES
O. T. Ledford
Hazel C. Ragland
INVENTORS
Charles T. Westlake
Charles F. Frede
By Edward W. Furrell
their Atty

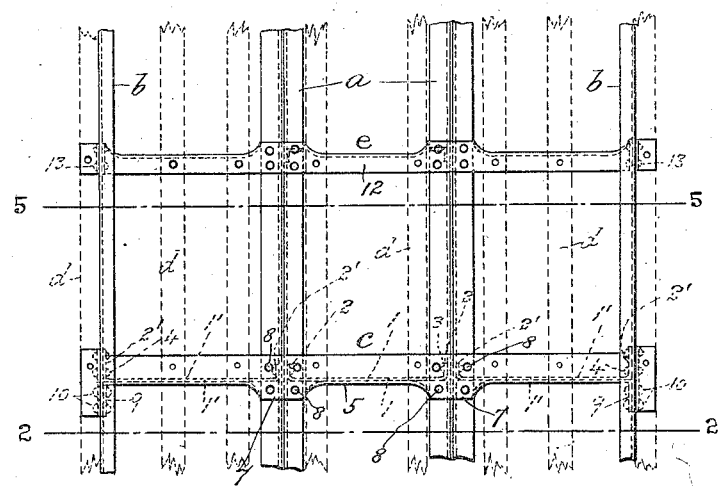
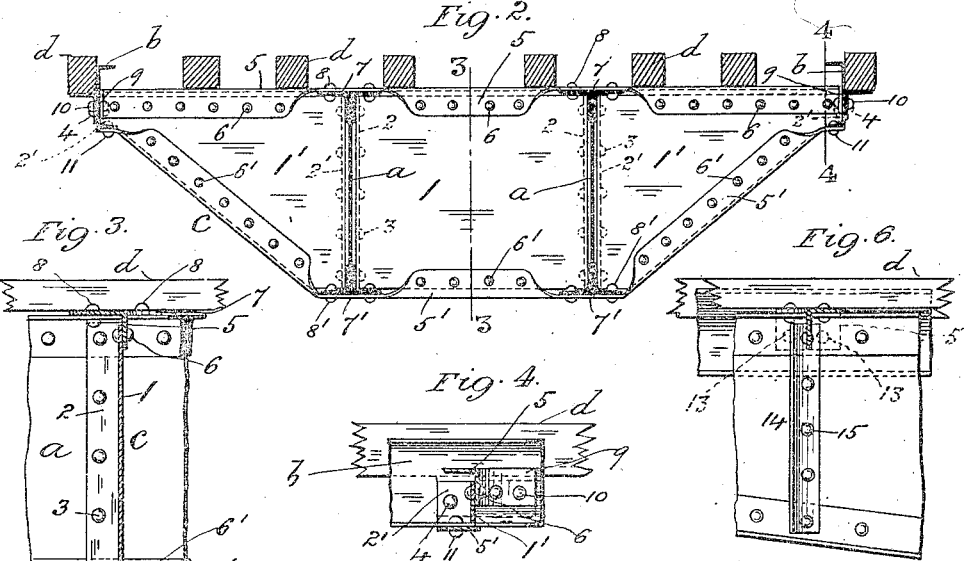
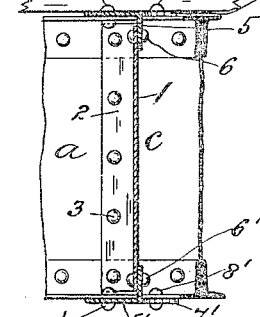
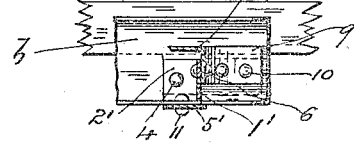
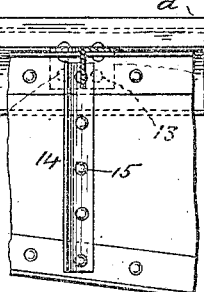
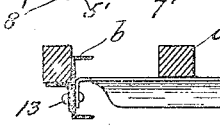

UNITED STATES PATENT OFFICE.

CHARLES T. WESTLAKE AND CHARLES F. FREDE, OF ST. LOUIS, MISSOURI, ASSIGNORS TO COMMONWEALTH STEEL COMPANY, OF ST. LOUIS, MISSOURI, A CORPORATION OF NEW JERSEY.

CAR-UNDERFRAME.

979,115.  Specification of Letters Patent.  Patented Dec. 20, 1910.

Application filed July 10, 1909. Serial No. 506,964.

*To all whom it may concern:*

Be it known that we, CHARLES T. WESTLAKE and CHARLES F. FREDE, citizens of the United States, residing at St. Louis, in the State of Missouri, have invented a new and useful Improvement in Car-Underframes, of which the following is a specification.

Our invention relates particularly to the needle-beams and dead-block of a metallic car underframe having preferably, deep middle longitudinal sills, and has for its object, firstly, to provide an inexpensive needle-beam (and floor-beam) of light and simple construction adapted to form an intermediate brace and to be rigidly fixed to the longitudinal sills of the underframe, and secondly, to provide means for rigidly connecting the dead-block to the longitudinal sills conjointly with its attachment to the end sill.

The invention consists in features of novelty as hereinafter described and claimed, reference being had to the accompanying drawing forming part of this specification, whereon, Figure 1, is a top plan view of part of a metallic car underframe having a needle-beam and floor-beam constructed respectively, according to our invention; Fig. 2, a vertical transverse section to enlarged scale through the underframe on line 2, 2, in Fig. 1, showing the needle-beam in side elevation; Figs. 3, and 4, vertical transverse sections to enlarged scale through the needle-beam on lines 3, 3, and 4, 4, respectively, in Fig. 2; Fig. 5, a similar view to Fig. 2 through the underframe on line 5, 5, in Fig. 1, showing the floor-beam in side elevation, and Fig. 6, a similar view to Fig. 3 through the floor-beam on line 6, 6, in Fig. 5; Fig. 7, a top plan view of the end portion of the underframe showing the dead-block fixed to the end sill and adapted to our invention; Fig. 8, a front elevation to enlarged scale of the dead-block and combined parts of the underframe thereat, and Fig. 9, a vertical transverse section therethrough on line 9, 9, in Fig. 8.

Like letters and numerals of reference denote like parts in all the figures.

Referring to Figs. 1 to 6, $a$ represents the two middle, and $b$ the two side longitudinal metallic sills (broken away) of a car underframe which in the present case are respectively, preferably, I-shaped and channel-shaped in cross section, the middle sills $a$ having their maximum depth at and for a suitable distance on each side of the transverse center of the car, and thence inclined upward at the bottom toward their end portions, and the side sills $b$ having a uniform depth throughout with their webs arranged vertically outward. Arranged transversely between and fixed to the longitudinal sills $a$ and $b$ is a needle-beam $c$ constructed according to our invention, having its maximum depth between the middle sills $a$ and thence inclined upward at the bottom to each side sill $b$ as shown. The needle-beam $c$ consists preferably, of an upright web which is divided longitudinally into three parts or sections, a middle part 1 located between the middle sills $a$ and having end flanges 2 (or equivalent members) adapted to bear against the inside faces of the middle sills $a$ to which they are fixed preferably, by rivets 3, and two side parts 1' located respectively, between each side sill $b$ and the corresponding middle sill $a$, and having end flanges 2' (or equivalent members) which at one end of the parts 1' are adapted to bear against the side sills $b$ and are fixed thereto preferably, by rivets 4, and at the other end against the middle sills $a$ to which they are fixed by the rivets 3 before mentioned through the end flanges 2 of the middle part 1. The top or tension member of the needle-beam $c$ on which the wood floor-sills $d$ are supported, consists preferably, of an angle-bar 5 in one length having its vertical leg adapted to bear against and fixed to the web or parts 1, 1', at one side thereof by rivets 6, and its horizontal leg adapted to overlie and bear on the middle sills $a$ where it is formed in the same plane, with flattened out portions 7 of the vertical leg and fixed therewith to the top of the sills $a$ by rivets 8, the vertical leg of the angle-bar 5 being also preferably, formed at each end with a flange 9 which extends horizontally in a direction opposite to the end flange 2' of the web or part 1' thereat along the web of the side sill b to which the flange 9 is fixed preferably by rivets 10. Similarly, the bottom or compression member of the needle-beam c consists preferably, of an angle-bar 5' in one length having its vertical leg bearing against and fixed to the side of the web or parts 1, 1', by rivets 6' and its horizontal leg adapted to underlie and bear against the bottom of the middle sills a where it is formed in the same plane with flattened out portions 7' of the vertical leg and fixed therewith to the bottom of the sills a by rivets 8', the horizontal leg being also at each end directed under and fixed to the bottom of the corresponding side sill b by rivets 11. e represents our improved floor-beam which preferably, consists of an angle-bar 12 in one length arranged transversely to the longitudinal sills a and b for supporting the wood floor-sills d, the angle-bar 12 being formed, and fixed to the underlying top of the middle sills a in the same manner as the top or tension member 5 of the needle-beam c and having its legs respectively, at each end directed downward and laterally, and fixed to the web of the corresponding side sill b by rivets 13, the angle-bar 12 being combined with an upright angle-bar 14 which is fixed to the inside face of each middle sill a immediately beneath or in the vertical plane of the floor-beam proper by rivets 15.

Figs. 7 to 9, show our improved means for connecting the dead-block f to the longitudinal sills a and b conjointly with its usual attachment to the end sill g of the underframe. For this purpose the end sill g which in the present case is channel-shaped in cross section having its web vertical and inward, is preferably, formed in the middle with a bottom recess 16 for the reception therein of the dead-block f which preferably, projects forward and rearward of the end sill g thereat, and is formed at each end with a rear upright flange 17 which is adapted to bear against, and is rigidly fixed by rivets 18 to the adjacent rear face of the end sill g at the corresponding side of the recess 16, the dead-block f having also adjacent and at right angles to each flange 17, a horizontal flange 19 which bears against the bottom of, and supports the end sill g thereat, the flanges 19 being fixed to the bottom of the end sill g by rivets 20. From the bottom of the dead-block f transversely thereto and preferably, at each end thereof depend two opposite upright walls or members 21 forming an intermediate opening for the passage of the draw-bar 22 (indicated by dotted lines in Fig. 8) of a suitable draft-gear, each wall 21 having at the bottom an outwardly projecting horizontal flange 23 for the attachment thereto by bolts 24 of a carry-iron 25 for the said bar. Or the carry-iron 25 may be attached to the dead-block f in any other suitable manner. From the rear face of the dead-block f, adjacent to the flanges 17, project two opposite upright diverging flanges or webs 26 of suitable height, to which are fixed, preferably by rivets 27, the end portions of two corresponding diverging horizontal braces 28, which in the present case are channel-shaped in cross section with their webs vertical and inward against the flanges 26, the other ends of the braces 28 being in the present case fixed to the body-bolster h which is secured to the longitudinal sills a and b in the usual or any suitable manner. By this construction of the dead-block f any shock or stress thereon is imparted simultaneously to the end sill g and to the longitudinal sills a and b and thereby more uniformly distributed through the underframe than when the stress is received initially by the end sill alone.

We do not limit ourselves to connecting the dead-block f by the braces 28 with the body-bolster h and thence to the longitudinal sills a and b as described, as the dead-block may be connected directly to the longitudinal sills in any suitable manner without departing from the principle of our invention which is to connect the dead-block to the said sills conjointly with its attachment to the end sill of the underframe.

What we claim as our invention and desire to secure by Letters Patent is:—

1. In a car underframe of the class described, a needle-beam comprising an upright member made in sections, a top and bottom member respectively L-shaped and flat in cross section alternately, and means for fixing the said web and members to the said frame, substantially as described.

2. In a car underframe of the class described, a needle beam comprising an upright web, and a top member, alternately L-shaped and flat in cross section, and having at each end a bent portion adapted to be connected to the side sills of the said frame.

3. In a car underframe of the class described, a needle beam comprising an upright web, and a bottom member, alternately L-shaped and flat in cross section, and adapted at its ends to be connected to the side sills of the said frame.

4. In a car underframe of the class described, a needle beam comprising an upright web and a top and bottom member respectively, L-shaped and flat in cross section alternately, and adapted at their ends to be connected to the side sills of the said frame, substantially as described.

5. In a car underframe of the class described, a needle beam comprising an upright web made in sections, and a bottom member, alternately L-shaped and flat in cross section and adapted at its ends to be connected to the side sills of the said frame, substantially as described.

6. In a car underframe of the class described, a needle beam comprising an upright web, and a top and bottom member respectively, L-shaped and flat in cross section alternately, and adapted at their ends to be connected to the side sills of the said frame, substantially as described.

CHARLES T. WESTLAKE.
CHARLES F. FREDE.

Witnesses:
EDWARD W. FURRELL,
HAL C. BELLVILLE.